M. P. HOLMES.
TRUCK.
APPLICATION FILED DEC. 11, 1918. RENEWED FEB. 4, 1921.
1,378,817.
Patented May 17, 1921.
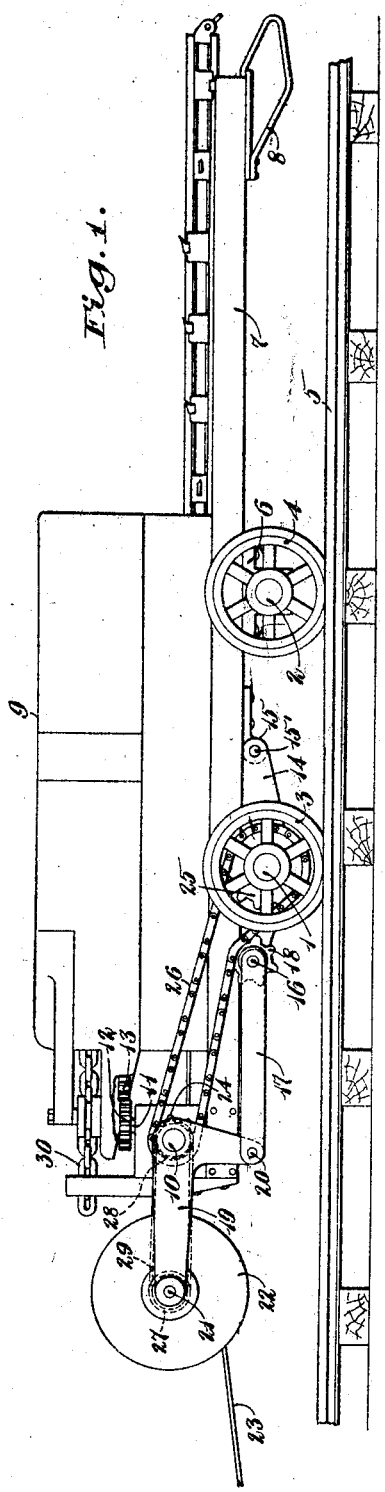
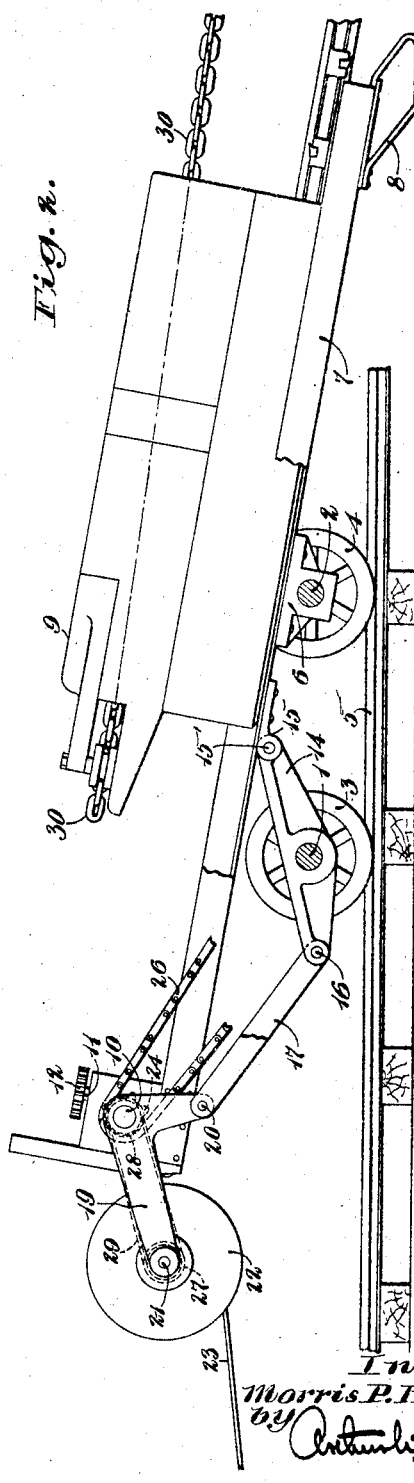
Inventor:
Morris P. Holmes.
by
atty.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,817.  Specification of Letters Patent.  Patented May 17, 1921.

Application filed December 11, 1918, Serial No. 266,316. Renewed February 4, 1921. Serial No. 442,597.

*To all whom it may concern:*

Be it known that I, MORRIS P. HOLMES, a citizen of the United States, residing at Claremont, in the county of Sullivan and State of New Hampshire, have invented certain new and useful Improvements in trucks, of which the following is a full, clear, and exact specification.

My invention relates to trucks, and more particularly to mining machine trucks, the object of the present invention being to provide a counterbalanced, tilting, solid frame truck which will remain in a tilted position after the unloading of the mining machine but which will be automatically returned to a horizontal position when the machine is loaded onto the truck.

This improved truck possesses the advantages of the solid frame trucks now in use in that the bed or main truck frame is solid and substantial, without having the disadvantages of this type of truck in which the rear wheels are raised from the track during the unloading operation and are permitted to fall on the track after the mining machine is unloaded, with a resulting breakage of car wheels, cable reel supports, and, frequently, a derailing of the truck. These and other objects and advantages of my improved construction will hereinafter more fully appear.

In the accompanying drawings I have shown for purposes of illustration one embodiment which my invention may assume in practice.

In these drawings,—

Figure 1 is a side elevation of my improved truck with the mining machine thereon in loaded position.

Fig. 2 is a side elevation, partly broken away, of the truck with the mining machine unloading therefrom.

Referring to the drawings, I have there shown for the purpose of illustrating the principal features of the invention, a four-wheel truck having a plurality of axle members 1 and 2 carrying wheels 3 and 4 adapted to run on rails 5. The front axle 2 is journaled in an axle box 6 which is preferably securely attached to a rigid frame 7 in such a manner that this frame may be swung on the front axle as a pivot. As shown, this frame extends in front and rear of the two axles and is provided at its front end with a loading shoe 8, the latter preferably comprising a forwardly extending reversed frame member which limits the swinging movement of the frame and functions as a loading skid to facilitate the loading of the mining machine 9 onto the truck frame 7. At its rear end the frame is provided in a well known manner with a transverse driving shaft 10 and a substantially vertically disposed shaft 11, the latter being driven by the mining machine 9 through suitable spur gears 12, 13, and in turn driving the shaft 10 through a worm and worm gear, not shown.

The rear axle 1 is, in my improved construction, mounted in an elongated axle box 14 hingedly secured, as shown at 15, to the frame 7 at a point slightly to the rear of the front axle 2. On the opposite end of this axle box from the hinged connection with the frame, there is provided a bolt 16 which supports one end of a floating link 17 and an idler wheel or sprocket 18 for a purpose hereinafter to be more fully described. If desired, the bolt or rod 16 and the hinge bolt 15' may extend transversely across the frame 7 to properly square the free ends of the axle boxes and to brace the frame 7, it being understood that the counterbalancing members, herein shown as mounted on one side (Fig. 1) of the truck, may be, and preferably are, duplicated on the opposite side, as shown in Fig. 2. Rotatably mounted on the rear of the frame, and preferably on the driving shaft 10, is a bell crank 19 connected at one end 20 to the floating link 17 and adapted to support at its other end, by means of a rod 21, a cable drum 22 carrying a cable 23 for supplying current to the mining machine, it being understood that where the mining machine is operated by an air motor a hose reel may be substituted for the cable reel.

In the type of truck now commonly used for transporting mining machines, the truck is driven through a driving connection from one or more of the wheels to a driving shaft, such as is illustrated at 10. For this purpose there is provided on the driving shaft and rear axle suitable wheels or sprockets 24, 25, a flexible connection, as a chain 26, being passed over these wheels to transfer the driving force from the shaft to the rear axle 1. As is clear from a comparison of Figs. 1 and 2, when the mining machine truck is tilted to unload or load the machine, the distance between the shaft 9 and the axle 1 is increased, and it is therefore necessary to provide a relatively long flexible member to permit a proper movement between the truck frame and the rear axle. It will be noted that by the use of the idler wheel 18 mounted on the rear axle box 14, the slack in the chain is automatically taken up and let out as the frame is moved to the loaded or to the unloading position.

In trucks of the type herein shown, the reel and cable attached thereto weigh, in practice, between two and three hundred pounds, and I have provided means composed of the bell crank 19, the floating link 17, and the rear axle box 14, for utilizing this weight to balance the truck frame in such a manner that when the mining machine moves off the truck this reel will hold the mining machine truck in a tilted position. It will be noted that this bell crank and floating link are so positioned that, when the parts are in the position shown in Fig. 2, the weight of the reel tends to force the left hand or free end of the axle box 14 away from the truck frame member 7 to hold the rear end of this frame member elevated. The two arms of the bell crank may be so proportioned that the movement of the reel is more than sufficient to balance the truck frame, so that, should tools be placed near the rear of the frame, or should a workman sit on this end of the truck when it is in unloading position, the extra weight will not return the truck to a loaded position.

For the purpose of rotating the reel to reel in or pay out the cable or hose as the machine is moved to the left or to the right along the track, I have provided suitable reel rotating means, herein shown as comprising sprocket wheels 27, 28 mounted on the drum head and the shaft, respectively, a chain 29 being passed over these two sprocket wheels to operate the reel.

From the foregoing it is clear that as the mining machine is moved off from the truck under its own power by means of the chain 30 which is connected to a fork in advance of the machine, the weight of the machine will tilt the truck from loaded position (Fig. 1) to unloading position (Fig. 2), so that the machine may easily slide off the truck onto the mine floor. After the mining machine has been completely unloaded, the reel will counterbalance the truck frame and will hold it in unloading position so that when it is desired to reload the mining machine the truck is in position to receive the machine.

It will be noted that, by my improved construction, I have provided a wheeled frame or bed to receive the mining machine and to support the reel and the truck driving mechanism, and that I have provided a simple, automatically acting mechanism composed of but few parts for normally holding the truck in loading or unloading position when the mining machine is not completely loaded on the truck. It will further be noted that the means herein shown for counterbalancing the weight of the truck can be easily manufactured, will not easily get out of order, and that the parts thereof are strong and substantially made.

While I have herein specifically described one embodiment which my invention may assume in practice, it is to be understood that the form shown and described is used for purposes of illustration, and that the invention may be modified and embodied in various other forms without departing from its spirit.

What I claim as new and desire to secure by Letters Patent is:

1. In a mining machine truck, a tiltable machine carrying frame, a supporting member therefor, and counterbalancing means mounted on said frame and engaging said member for retaining said frame in a tilted position.

2. In a mining machine truck, a tiltable machine carrying frame, a supporting member therefor, and reel supporting means mounted on said frame and engaging said member for retaining said frame in a tilted position.

3. In a mining machine truck, a tiltable machine carrying frame, a supporting member therefor, and counterbalancing means including a reel mounted on said frame and adapted to engage said member for normally retaining said frame in a tilted position.

4. In a mining machine truck, a tiltable machine carrying frame, said frame being tiltable by a mining machine movable thereover, a supporting member for the rear end of the frame, and counterbalancing means mounted on said frame and engaging said member for normally retaining the frame in an inclined position.

5. In a mining machine truck, a tiltable machine carrying frame, said frame being tiltable by a mining machine movable thereover, a supporting member for the rear end of the frame, and reel supporting means mounted on said frame and engaging said member for normally retaining the frame in an inclined position.

6. In a mining machine truck, a tiltable machine carrying frame, said frame being tiltable by a mining machine movable thereover, a supporting member for the rear end of the frame, and counterbalancing means mounted on said frame and movable relative thereto and engaging said member for normally retaining the frame in an inclined position.

7. In a mining machine truck, a tiltable machine carrying frame, said frame being tiltable by a mining machine movable thereover, a supporting member for the rear end of the frame, and reel supporting means mounted on said frame and movable relative thereto and engaging said member for normally retaining the frame in a tilted position.

8. In a mining machine truck, a tiltable machine carrying frame, a supporting member movable relative to said frame, and counterbalancing means mounted on said frame and engaging said member for normally retaining said frame in a tilted position.

9. In a mining machine truck, a tiltable machine carrying frame, a supporting member movable relative to said frame, and reel supporting means mounted on said frame and engaging said member for normally retaining said frame in a tilted position.

10. In a mining machine truck, a tiltable machine carrying frame having a pivot support, a supporting member movable relative to said frame, and counterbalancing means mounted on said frame and movable relative thereto and engaging said member for normally retaining said frame in a tilted position.

11. In a mining machine truck, a tiltable machine carrying frame having a pivot support, a supporting member movable relative to said frame, and reel supporting means mounted on said frame and movable relative thereto and engaging said member for normally retaining said frame in a tilted position.

12. In a mining machine truck, a tiltable machine carrying frame having a pivot support, a supporting member therefor, and counterbalancing means pivotally mounted on said frame and engaging said member for normally retaining said frame in a tilted position.

13. In a mining machine truck, a tiltable machine carrying frame having a pivot support, a supporting member therefor, and reel supporting means pivotally mounted on said frame and engaging said member for normally retaining said frame in a tilted position.

14. In a mining machine truck, a tiltable machine carrying frame, a support therefor, operative connections between said elements for maintaining said frame in tilted position, and a reel carried by said connections and actuating the same upon a tilting movement of said frame.

15. In a mining machine truck, a tiltable machine carrying frame, a wheeled support pivotally connected thereto, operative connections between said elements for maintaining said frame in tilted position, and a reel carried by said connections for actuating the same upon tilting of said frame.

16. In a mining machine truck, a tiltable machine carrying frame, a support therefor, and counterbalancing means including a pivoted reel and operatively connected between said frame and support for automatically maintaining the former in tilted position upon a tilting movement thereof.

17. In a mining machine truck, a tiltable machine carrying frame, a wheeled support therefor pivotally connected thereto, link connections pivotally connecting said frame and said support, and a reel operatively connected to said connections and controlling the position thereof when said frame is tilted.

18. In a mining machine truck having front and rear axles, a machine carrying frame pivoted on said front axle and extending in the rear of said rear axle, said frame being tiltable about said front axle to and from unloading position by a machine movable thereover, and automatically acting counterbalancing means mounted adjacent the rear end of said frame and operatively connected with said rear axle to normally retain said frame in a tilted position.

19. In a mining machine truck having front and rear axles, a machine carrying frame pivoted on said front axle and extending in the rear of said rear axle, said frame being tiltable about said front axle to and from unloading position by a machine movable thereover, a member engaging said rear axle, and counterbalancing means mounted on said frame and engaging said member for normally retaining the frame in an unloading position.

20. In a mining machine truck having front and rear axles, a machine carrying frame pivoted on said front axle and extending in the rear of said rear axle, said frame being tiltable about said front axle to and from unloading position by a machine movable thereover, and automatically acting reel supporting means mounted adjacent the rear end of said frame and operatively connected with said rear axle to normally retain said frame in a tilted position.

21. In a mining machine truck having front and rear axles, a machine carrying frame pivoted on said front axle and extending in the rear of said rear axle, said frame being tiltable about said front axle to and from unloading position by a machine movable thereover, a member engaging said rear axle, and reel supporting means mounted on said frame and engaging said member for normally retaining the frame in an unloading position.

22. In a mining machine truck having front and rear axles, a machine carrying frame pivoted on said front axle and extending in the rear of said rear axle, said frame being tiltable about said front axle to and from unloading position by a machine movable thereover, a member hingedly connected to the frame and engaging said rear axle, and counterbalancing means mounted on said frame and engaging said member for normally retaining the frame in an unloading position.

23. In a mining machine truck having front and rear axles, a machine carrying frame pivoted on said front axle and extending in the rear of said rear axle, said frame being tiltable about said front axle to and from unloading position by a machine movable thereover, a member hingedly connected to the frame and engaging said rear axle, and reel supporting means mounted on said frame and engaging said member for normally retaining the frame in an unloading position.

24. In a mining machine truck, an axle, a tiltable mining machine frame pivotally supported on said axle, an axle box hingedly connected to said frame and supported by a rear axle, and a bell crank mounted on said frame and adapted to support a reel, said bell crank being operatively connected to said axle box to normally retain the frame in a tilted position.

25. In a mining machine truck, a tiltable machine carrying frame pivotally supported at one end, a supporting axle box therefor, an axle mounted thereon, counterbalancing means mounted on said frame for normally retaining said frame in a tilted position, and coöperating means mounted on said frame and axle for driving the truck.

26. In a mining machine truck, a tiltable machine carrying frame pivotally supported at one end, a supporting axle box therefor, an axle mounted thereon, reel supporting means mounted on said frame for normally retaining said frame in a tilted position, and coöperating means mounted on said frame and axle for driving the truck.

27. In a mining machine truck, a tiltable machine carrying frame pivotally supported at one end, a supporting axle box therefor, an axle mounted thereon, reel supporting means mounted on said frame for normally retaining said frame in a tilted position, coöperating means mounted on said frame and axle for driving the truck, and means for rotating the reel.

28. In a mining machine truck, a tiltable machine carrying frame pivotally supported at one end, a supporting axle box therefor, an axle mounted thereon, counterbalancing means mounted on said frame for normally retaining said frame in a tilted position, coöperating means including a chain mounted on said frame and axle for driving the truck, and means for taking up the slack in said chain as the frame is tilted.

29. In a mining machine truck, a tiltable machine carrying frame element, a frame supporting truck element with respect to which said frame element makes an angle when in tilted position, and counter-balancing means operatively connected to said truck element and to said frame element and tending to maintain said angle when said truck is unloaded.

30. In a mining machine truck, a tiltable machine carrying frame element, a frame supporting truck element with respect to which said frame element makes an angle when in tilted position, and means having a fulcrum on one of said elements and exerting a force upon the other thereof to maintain said elements in angular relation when said truck is unloaded.

In testimony whereof I affix my signature.

MORRIS P. HOLMES.